Patented June 30, 1931

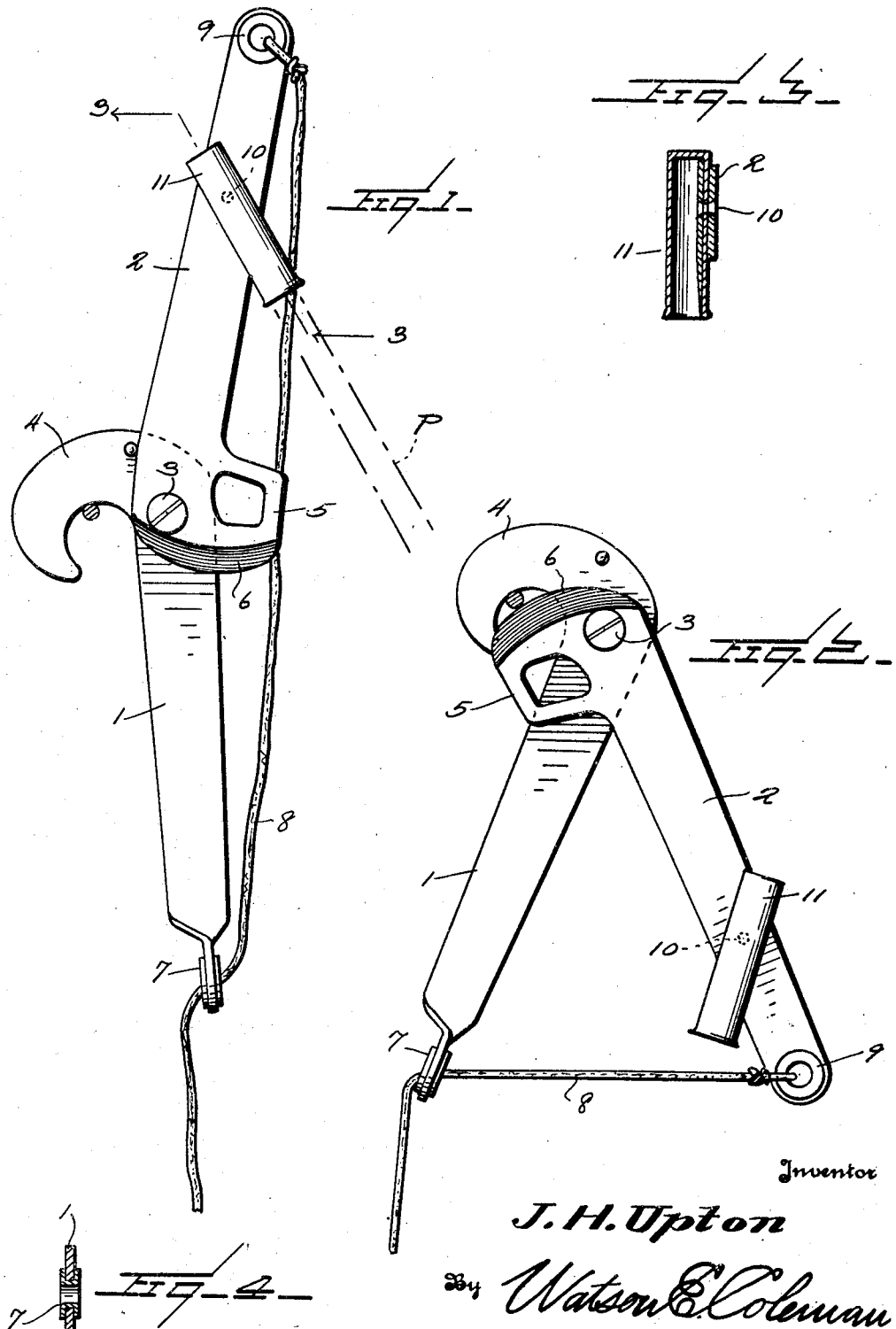

1,812,387

UNITED STATES PATENT OFFICE

JOHN H. UPTON, OF DUNSMUIR, CALIFORNIA

CUTTING IMPLEMENT

Application filed July 22, 1930. Serial No. 469,870.

This invention relates to a cutting implement and primarily it is an object of the invention to provide a device of this kind particularly designed for use by fishermen for cutting lose tackle which may become entangled on branches while casting along any stream or lake.

Another object of the invention is to provide a device of this kind which may be readily applied to the tip portion of a fishing pole or rod, together with means whereby the desired cutting of a tree branch or the like may be easily and conveniently accomplished by a person on the ground.

The invention consists in the details of construction and in the combination and arrangement of the several parts of my improved cutting implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in elevation illustrating a cutting implement constructed in accordance with an embodiment of my invention, a branch or the like to be cut being shown in section and with the cutting members of the implement in their relative separated or open position;

Figure 2 is a view similar to Figure 1 showing the cutting members in closed position and about to effect a cut through a branch or the like; and Figure 3 is a sectional view taken substantially on the line 3—3 of Figure 1.

Figure 4 is a detailed sectional view through the outer portion of one of the elongated flat members.

As disclosed in the accompanying drawings, my improved implement comprises two elongated flat members 1 and 2 having end portions pivotally connected, as at 3, whereby said members 1 and 2 are capable of relative swinging movement one with respect to the other.

The pivoted end portion of the member 1 is provided with a lateral extension 4 constituting a hook member facing inwardly of the member 1. The pivoted end portion of the member 2 is also provided with a lateral extension 5 disposed in the same general direction as the extension 4 of the member 1. The outer marginal portion of the extension 5 is formed to provide a knife edge 6 which also extends across the adjacent end of the member 2 proper.

The end portion of the member 1 remote from its lateral extension or hook 4 is disposed on a quarter turn, as at 7, and through which portion is freely disposed a flexible member 8. This member 8 is tied to the end portion of the member 2 remote from its lateral extension 5. This tying or securing of the flexible member 8 to the member 2 is facilitated by providing the member 2 with the opening 9.

The member 2 at a desired point inwardly of the opening 9 has pivotally connected thereto, as at 10, a ferrule or sleeve 11 which is adapted to receive the tip portion of a fishing rod or pole P diagrammatically indicated by broken lines in Figure 1.

It often occurs in casting that a fishing line becomes entangled upon a branch of a tree and under such conditions my improved cutting implement is employed to advantage in the retrieving of any such fishing tackle.

When my improved tool is to be used, the tip portion of a fishing pole or rod is slipped within the ferrule 11 and owing to the pivotal connection of said ferrule 11 with the member 2, the cutting implement can be readily raised and placed at any angle to effect the engagement of the extension or hook 4 of the plate 1 over the branch to be cut. After the implement has been initially engaged with the branch the pole is removed or freed from the ferrule 11 and then upon requisite pull being imposed upon the flexible member 8, the member 2 will be swung in a direction to bring the knife edge 6 into proper cutting action on the branch resulting in the desired severing of such branch. If the line should be entangled with more than one branch, this cutting operation will, of course, be repeated as many times as may be required.

It is to be understood that the flexible member 8 is of such length as to be readily grasped by a person on the ground after the implement has been engaged with the desired branch.

From the foregoing description it is thought to be obvious that a cutting implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. As a new article of manufacture, a cutting implement comprising two connected members freely movable one with respect to the other, one of said members having work engaging means and the other being provided with a cutting edge, and socket means pivotally carried by the second member for detachable engagement with the tip portion of a fishing pole or the like.

2. As a new article of manufacture, a cutting implement comprising two members pivotally connected one to the other for free relative swinging movement, the pivoted end portion of one of the members being laterally extended to provide an inwardly facing hook, the pivoted end portion of the second member having a margin formed into a knife edge, and a ferrule pivotally connected to the second member and adapted to receive the tip portion of a fishing pole or the like.

3. As a new article of manufacture, a cutting implement comprising two elongated members connected for relative movement, one of said members being provided with a hook and the other with a cutting edge coacting with the hook of the first member, socket means pivotally carried by the second member for detachably engaging the same with the tip portion of a fishing pole or the like, and means for moving the second member with respect to the other to bring the knife edge into cutting action.

In testimony whereof I hereunto affix my signature.

JOHN H. UPTON.